(12) United States Patent  (10) Patent No.: US 9,164,773 B2
Chaganti  (45) Date of Patent: Oct. 20, 2015

(54) DECIDING BOOTING OF A SERVER BASED ON WHETHER ITS VIRTUAL INITIATOR IS CURRENTLY USED BY ANOTHER SERVER OR NOT

(71) Applicant: Ravikanth Chaganti, Bangalore (IN)

(72) Inventor: Ravikanth Chaganti, Bangalore (IN)

(73) Assignee: Dell Products, LP, Round Rock, TX (US)

( * ) Notice: Subject to any disclaimer, the term of this patent is extended or adjusted under 35 U.S.C. 154(b) by 331 days.

(21) Appl. No.: 13/624,436

(22) Filed: Sep. 21, 2012

(65) Prior Publication Data

US 2014/0089649 A1 Mar. 27, 2014

(51) Int. Cl.
*G06F 9/44* (2006.01)
*G06F 17/30* (2006.01)

(52) U.S. Cl.
CPC ........ *G06F 9/4401* (2013.01); *G06F 17/30194* (2013.01)

(58) Field of Classification Search
CPC ..... G06F 15/177; G06F 15/17; G06F 9/4401; G06F 9/4406; G06F 3/06; G06F 3/00; G06F 9/26; G06F 9/34; G06F 9/455; G06F 17/30194; H04L 41/50
USPC .......................................................... 713/2
See application file for complete search history.

(56) References Cited

U.S. PATENT DOCUMENTS

| | | | |
|---|---|---|---|
| 7,197,576 B1 * | 3/2007 | Lo et al. | 710/2 |
| 7,360,072 B1 * | 4/2008 | Soltis et al. | 713/2 |
| 7,962,672 B1 * | 6/2011 | Martin et al. | 710/38 |
| 8,037,475 B1 | 10/2011 | Jackson | |
| 2002/0184484 A1 | 12/2002 | Abboud et al. | |
| 2003/0093712 A1 * | 5/2003 | Cepulis | 714/13 |
| 2005/0010688 A1 * | 1/2005 | Murakami et al. | 709/245 |
| 2006/0112286 A1 | 5/2006 | Whalley et al. | |
| 2007/0005816 A1 * | 1/2007 | Diamant et al. | 710/2 |
| 2007/0100977 A1 | 5/2007 | Barry | |
| 2007/0192466 A1 * | 8/2007 | Nahum | 709/223 |
| 2007/0233983 A1 * | 10/2007 | Tanaka et al. | 711/163 |
| 2007/0260912 A1 * | 11/2007 | Hataseki et al. | 714/4 |
| 2008/0028035 A1 * | 1/2008 | Currid et al. | 709/217 |
| 2008/0162839 A1 * | 7/2008 | Nakamichi et al. | 711/159 |
| 2008/0256308 A1 * | 10/2008 | Kumagai | 711/154 |
| 2009/0006735 A1 * | 1/2009 | Kumagai et al. | 711/112 |
| 2009/0049293 A1 * | 2/2009 | Jiang | 713/2 |
| 2009/0073896 A1 * | 3/2009 | Gillingham et al. | 370/255 |
| 2009/0138580 A1 * | 5/2009 | Takamoto et al. | 709/222 |
| 2010/0191948 A1 * | 7/2010 | Komoriya et al. | 713/2 |
| 2010/0223451 A1 * | 9/2010 | Hitaka et al. | 713/2 |

(Continued)

FOREIGN PATENT DOCUMENTS

JP 2007094611 A * 4/2007

*Primary Examiner* — Thomas Lee
*Assistant Examiner* — Santosh R Poudel
(74) *Attorney, Agent, or Firm* — Larson Newman, LLP

(57) ABSTRACT

A method includes determining, by a management controller of a first server in a storage network, if a first virtual initiator is used by a second server in the storage network, wherein the first virtual initiator includes first boot information for allocating a first storage resource of the storage network, aborting a boot up of the first server in response to determining that the first virtual initiator is being used by the second server, and proceeding with the boot up of the first server in response to determining that the first virtual initiator is not used by the second server, wherein the boot up proceeds using the first boot information to allocate the first storage resource to the first server.

20 Claims, 4 Drawing Sheets

(56) References Cited

U.S. PATENT DOCUMENTS

| | | | |
|---|---|---|---|
| 2010/0235465 A1* | 9/2010 | Thorpe et al. | 709/217 |
| 2011/0083129 A1* | 4/2011 | Masaki | 717/175 |
| 2011/0246714 A1* | 10/2011 | Zhou et al. | 711/112 |
| 2011/0280252 A1* | 11/2011 | Murakami et al. | 370/401 |
| 2011/0302444 A1* | 12/2011 | Tashima | 714/2 |
| 2012/0066607 A1* | 3/2012 | Song et al. | 715/737 |
| 2012/0151054 A1* | 6/2012 | Zhang et al. | 709/225 |
| 2012/0226895 A1* | 9/2012 | Anderson et al. | 713/2 |
| 2012/0233450 A1* | 9/2012 | Lee et al. | 713/2 |
| 2012/0254462 A1* | 10/2012 | Sengupta et al. | 709/238 |
| 2012/0290750 A1* | 11/2012 | Kawaguchi | 710/74 |
| 2013/0086583 A1* | 4/2013 | Uemura et al. | 718/1 |
| 2014/0250239 A1* | 9/2014 | Lambert et al. | 709/242 |

\* cited by examiner

DECIDING BOOTING OF A SERVER BASED ON WHETHER ITS VIRTUAL INITIATOR IS CURRENTLY USED BY ANOTHER SERVER OR NOT

FIELD OF THE DISCLOSURE

This disclosure relates generally to information handling systems, and relates more particularly to re-provisioning servers in a data center.

BACKGROUND

As the value and use of information continues to increase, individuals and businesses seek additional ways to process and store information. One option is an information handling system. An information handling system generally processes, compiles, stores, or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, data storage systems, and networking systems. An information handling system can include virtual machines that run operating systems and applications on a common host system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are illustrated and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion focuses on specific implementations and embodiments of the teachings. This focus is provided to assist in describing the teachings, and should not be interpreted as a limitation on the scope or applicability of the teachings. However, other teachings can be used in this application. The teachings can also be used in other applications, and with several different types of architectures such as distributed computing architectures, client/server architectures, or middleware server architectures and associated resources.

Figure 1:
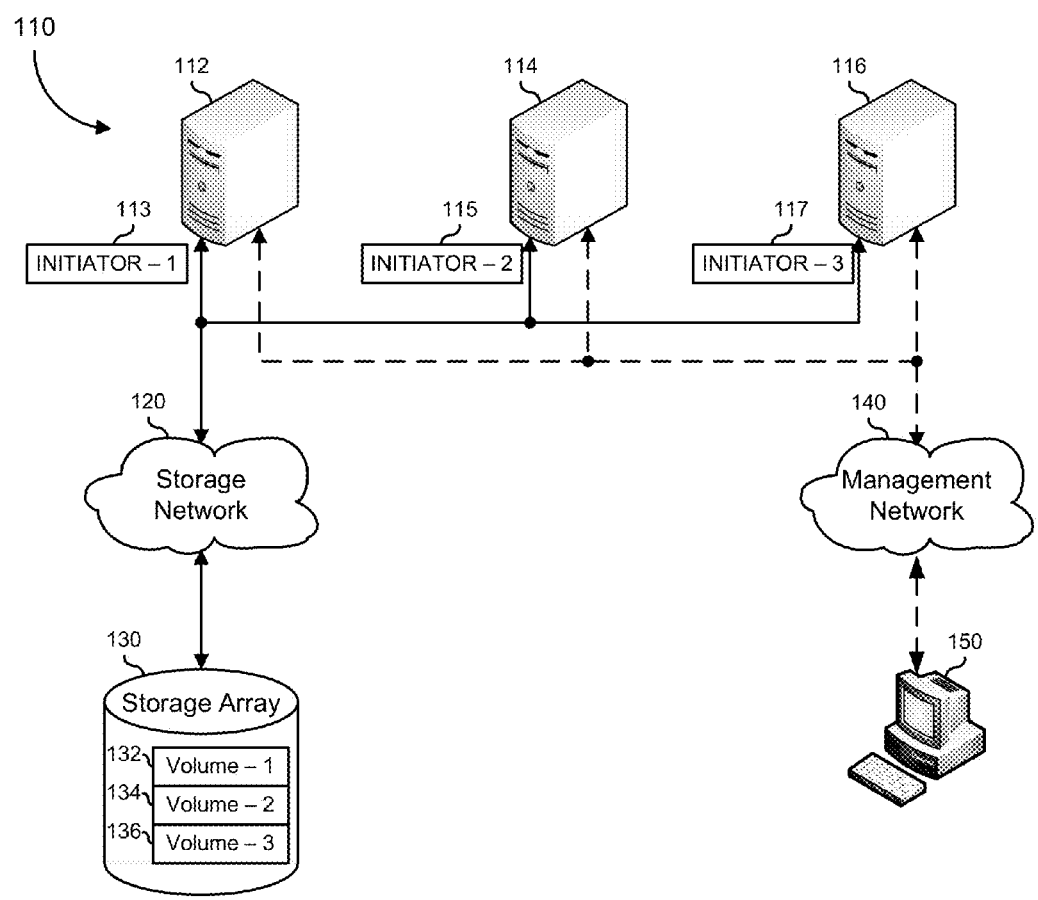
FIG. 1 is a block diagram of a data center according to an embodiment of the present disclosure.

FIG. 1 illustrates a data center 100. For purposes of this disclosure, data center 100 includes one or more information handling system. The information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic, and operates to execute code. Additional components of the information handling system may include one or more storage devices that can store code, one or more communications ports for communicating with external devices as well as various input and output (I/O) devices such as a keyboard, a mouse, and a video display. The information handling system may also include one or more buses operable to transmit communications between the various hardware components.

Data center 100 includes a server farm 110, a storage network 120, a storage array 130, a management network 140, and a management station 150. Server farm 110 includes servers 112, 114, and 116. Servers 112, 114, and 116 are each connected to storage array 130 via storage network 120, and are connected to management station 150 via management network 140. Storage array 130 is partitioned into storage volumes 132, 134, and 136. In a particular embodiment, one or more of servers 112, 114, and 116 operate to connect to both storage network 120 and management network 140 via a single network connection. For example, server 112 can include a single network interface such as a network interface card (NIC), a host bus adapter (HBA), a converged network adapter (CNA), or the like, over which the server gains access to all network resources such as to storage network 120, to management network 130, to an internal interne, to the Internet, to other network resources, or to a combination thereof. Here, the network interface can provide a single logical interface such as a single Media Access Control (MAC) address or a single Internet Protocol (IP) address, through which all network traffic associated with server 112 is handled, or the network interface can provide for multiple virtual network interfaces such as multiple MAC addresses or multiple IP addresses, in order to segregate the network traffic handled by the server, thereby providing separate network accessibility for the server to storage network 120 and to management network 140.

In another embodiment, one or more of servers 112, 114, and 116 operate to connect to storage network 120 and to management network 140 via separate network connections. For example, server 114 can include a network interface over which the server gains access to storage network 120, and another network interface over which the server gains access to management network 140. Here, server 114 can gain access to an internal interne, to the Internet, or to other network resources via a one of the separate network interfaces or via a third network interface. For example, the first network interface can provide for multiple virtual network interfaces such as multiple MAC addresses or multiple IP addresses, in order to segregate the network traffic handled by server 114, thereby providing separate network accessibility for the server to storage network 120 and to the other network resources, and the second network interface can be dedicated to provide access to management network 140.

Each of servers 112, 114, and 116 includes a respective initiator 113, 115, and 117 that initiates a storage session on storage network 120. The storage sessions provide each of servers 112, 114, and 116 with access to a respective storage volume 132, 134, and 136. Thus initiator 113 initiates a storage session on storage network 120 to give server 112 access to storage volume 132, initiator 115 initiates a storage session on the storage network to give server 114 access to storage volume 134, and initiator 117 initiates a storage session on the storage network to give server 116 access to storage volume 136. In a particular embodiment initiators 113, 115, and 117 include Small Computer System Interface (SCSI) initiators that operate to address storage volumes 132, 134, and 136 in accordance with a SCSI protocol, or a protocol that encapsulates the SCSI protocol such as a Fibre Channel initiator, an Internet SCSI (iSCSI) initiator, or another such initiator. As such, storage network 120 operates to provide each of servers 112, 114, and 116 with a unique Logical Unit Number (LUN) that is associated with one of storage volumes 132, 134, or 136 such that a particular storage volume is only accessible to a single server. The skilled artisan will recognize that mechanisms exist that can provide for data sharing between servers 112, 114, and 116. However such mechanisms are beyond the scope of the present disclosure. In a particular embodiment initiators 113, 115, and 117 include an identifier for the respective storage volume 132, 134 and 136 such as an IP address for the storage volume, the LUN of the storage volume, or the like, and log in credentials such as a user name and a password according to the Challenge-Handshake Authentication Protocol (CHAP) authentication, or the like.

Servers 112, 114, and 116 are configured to accommodate a respective workload. For example server 112 can be configured to operate as an electronic mail (e-mail) server such as a Microsoft Exchange Server, an Oracle Communications Messaging Server, or another e-mail server. Server 114 can be configured to operate as a database server such as an SQL Server, a Microsoft Access Server, or another database server, and server 116 can be configured to operate as a web server such as an Apache HTTP server, and Oracle HTTP server, or another web server. Each workload is associated with a respective storage volume 132, 134, and 136. Thus, in furtherance of the above example, storage volume 132 can include e-mail archives for the e-mail server operating on server 112, storage volume 134 can include a relational database associated with the database server operating on server 114, and storage volume 136 can include hosted web pages for the web server operating on server 116.

The capabilities and capacities of servers 112, 114, and 116 are suited to the needs of the associated workloads. For example, the e-mail server workload may be operated on server 112 because server 112 may have lower storage bandwidth, and thus server 112 may be better suited to the archival operations that correspond to the e-mail workload. Over time, the patterns of usage and demand for the services provided by servers 112, 114, and 116 can change. For example, the number of e-mail clients can increase to a point where the storage bandwidth of server 112 is insufficient to handle the increased traffic. In a particular embodiment, a workload associated with one server 112, 114, or 116 can be re-provisioned onto another server that is better suited to the needs of the workload, and the associated server can be re-purposed to a different workload for which the server is better suited. The skilled artisan will recognize that the re-provisioning and re-purposing of servers in a server farm such as server farm 110 can be performed for a variety of reasons, as needed or desired.

When a workload on one or more of servers 112, 114, or 116 are re-provisioned onto another server, the associated initiator 113, 115, or 117 need to be transferred to the target server in order for the storage volume 132, 134, or 136 that is associated with the workload to become accessible to the workload on the new server. In a particular embodiment, when one or more workload is re-provisioned to a different server 112, 114, or 116, or when one or more server 112, 114, or 116 is re-purposed, an administrator configures the subject server with an initiator that permits the workload to access the associated storage volume 132, 134, or 136.

Servers 112, 114, and 116 each include a management controller that is accessible via management network 140, and that operates to provide managed services for the servers and to monitor the operations of the servers. For example, servers 112, 114, and 116 can each include a management controller that operates in accordance with an Intelligent Platform Management Interface (IPMI) such as a Baseboard Management Controller (BMC), an Integrated Dell Remote Access Controller (iDRAC), an Integrated Lights-Out (ILo) controller, a Remote Supervisor Adapter (RSA) controller, an Intel Active Management Technology (iAMT) controller, another management controller, or the like. In another embodiment, when one or more workload is re-provisioned to a different server 112, 114, or 116, or when one or more server 112, 114, or 116 is re-purposed, the management controller of the subject server fetches the initiator 113, 115, or 117 that is associated with the workload, and implements the fetched initiator on the subject server, so that the workload has access to the associated storage volume 132, 134, or 136.

Figure 2:
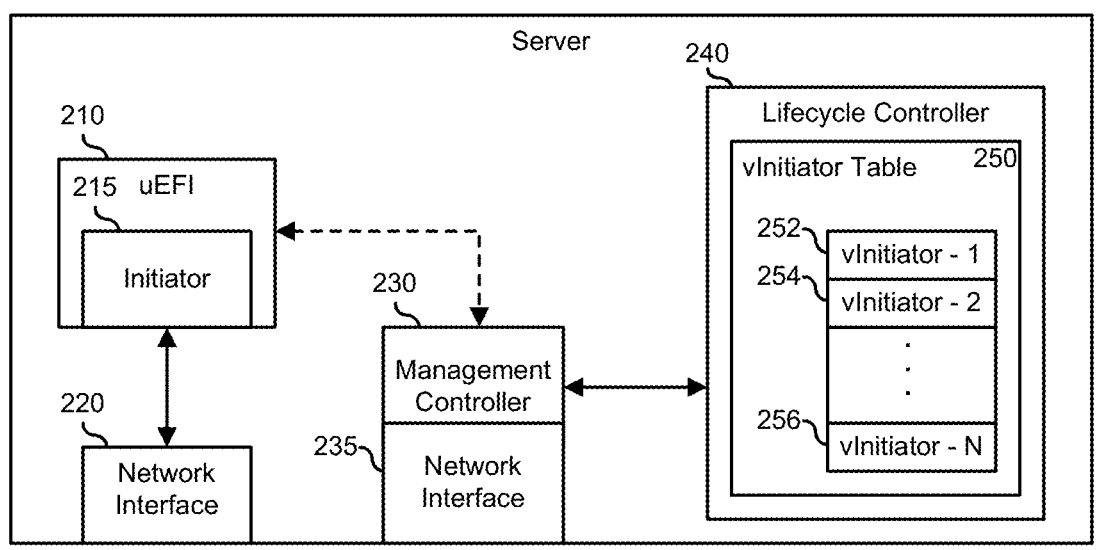
FIG. 2 is a block diagram of a server of the data center of FIG. 1.

FIG. 2 illustrates a server 200, similar to servers 112, 114, and 116, including a Unified Extensible Firmware Interface (uEFI) 210, a network adapter 220, a management controller 230 with an associated management controller network interface 235, and a lifecycle controller 240. Network interface 220 represents a network adapter such as a NIC, an HBA, a CNA, or the like, and includes boot settings that provide server 200 with access to a storage network similar to storage network 120. For example, the boot settings can include configuration settings for iSCSI storage access, including an IP address or LUN that is associated with a workload that is operated on server 200, and log in credentials. uEFI 210 also includes an initiator 215 similar to initiators 113, 115, and 117, and that initiates a storage session on a storage network similar to storage network 120. The storage session provides server 200 with access to a storage volume similar to storage volumes 132, 134, and 136. For example, initiator 215 can include an iSCSI initiator, or another initiator, as needed or desired. In a particular embodiment, the boot settings on network interface 220 are overridden by initiator 215 such that the storage volume access defined by the initiator is implemented in place of the storage network access provided by the boot settings. In another embodiment, uEFI 210 operates to change the boot settings in network interface 220 to reflect the storage volume access defined by initiator 215. In a particular embodiment, server 200 includes a Basic Input/Output System (BIOS) that operates similarly to uEFI 210.

Management controller 230 represents a BMC, an iDRAC, an ILo controller, a RSA controller, an iAMT controller, or the like, and operates to provide managed services for server 200 and to monitor the operations of the server. Management controller 230 includes an interface to uEFI 210 via, for example, a Low Pin Count (LPC) interface. Network interface 235 is associated with management controller 230, and represents a network adapter such as a NIC or the like, and provides management controller 230 with access to a management network similar to management network 140. In a particular embodiment, network interface 235 represents a separate network interface component of server 200 that is connected to management controller 230 via a system management bus (SMBus) interface. In another embodiment, network interface 235 is integrated into management controller 230. In either case, network interface 235 provides a management station similar to management station 150 with the ability to monitor and manipulate the operations of server 200, even when various portions of the server are powered down. For example, initiator 215 can be created, deleted, or modified by management controller 230 when server 200 is re-provisioned or re-purposed.

Lifecycle controller 240 represents a persistent storage device such as a flash memory device or another type of Non-Volatile Random Access Memory (NVRAM) that is associated with management controller 230 that embeds systems management features and Operating System (OS) device drivers directly on server 200, thus eliminating the need for media-based system management tools and utilities, and providing out of the box operability of the server. Lifecycle controller 240 includes a virtual initiator table 250 that includes multiple virtual initiator entries 252, 254, and 256. Each virtual initiator entry 252, 254, and 256 is associated with a workload that can be instantiated on server 200, and includes a virtual initiator name and the information needed to provide an initiator for that workload. For example, referring to FIG. 1, virtual entry 252 can be associated with the workload of server 112, and can include the information for implementing initiator 113. Similarly, virtual entry 254 can be associated with the workload of server 114, and can include in the information needed to implement initiator 115. Finally, virtual entry 256 can be associated with the workload of server 116, and can include in the information needed to implement initiator 117.

TABLE 1

Virtual Initiator Table

| Virtual Initiator Name | Target Storage Volume | User Name | Password |
|---|---|---|---|
| Exchange_APP | 192.168.100.200:3620 | Administrator | Password |
| SQL_APP | 192.168.100.210:3620 | Administrator | Password |
| Web_APP | 192.168.100.220:3620 | Administrator | Password |

Table 1, above, illustrates an example virtual initiator table. Here the first entry has an associated virtual initiator name for an Exchange server workload, such as Exchange_APP, an identifier for a target storage volume, and log in credentials, here represented as a user name and a password. Similarly, the second and third entries have associated virtual initiator names for a SQL server workload and a web server workload, respectively, identifiers for a target storage volumes, and log in credentials. The identifiers for the target storage volumes are illustrated as including IP addresses. In another embodiment, the identifiers include LUNs, or a combination of IP addresses and LUNs. The log in credentials represent CHAP authentication, or the like. In a particular embodiment, virtual initiator entries 252, 254, and 256 include an additional-network-configuration-required field that indicates that, in order to ensure that the re-purposed server 200 operates with the correct network access, additional network configuration is needed or desired. For example, a workload can include one or more associated virtual private networks (VPN). As such, if the re-provisioned or re-purposed server is connected to the storage network via a different switch port, then the storage network will also need to be reconfigured to associate the one or more VPNs with the new switch port. When the additional-network-configuration-required field is set, management controller 230 issues an alert/indication on the management network to another agent that can perform the action indicated by the alert. In another embodiment, the additional-network-configuration-required field can include other information as to the nature of the configuration actions that are needed, the target of the alert, or other information as needed or desired.

In a particular embodiment, when server 200 is booted, uEFI 210 accesses lifecycle controller 240 to present a boot option for selecting a virtual initiator entry 252, 254, or 256 from virtual initiator table 250. When a virtual initiator entry 252, 254, or 256 is selected, uEFI 210 retrieves the boot information for the associated workload, and instantiates the boot information in initiator 215, and server 200 is booted with the storage access specified by the selected virtual initiator entry. In a particular embodiment, uEFI 210 stores the boot information in a system NVRAM such that, upon subsequent booting of system 200, the uEFI does not need to access the boot information from lifecycle controller 240. Moreover, when server 200 is re-provisioned or re-purposed, a different virtual initiator entry 252, 254, or 256 that is associated with the new workload is selected, uEFI 210 retrieves the boot information from the newly selected virtual initiator entry, and initiator 215 is re-instantiated with the new boot information.

In a particular embodiment, virtual initiator table 250 is pre-populated with boot information associated with popular or common workloads, so that server 200 has out of the box operability for various workloads. For example, a manufacturer of rack based server systems can provide product options for several different workloads that are selectable by the user, and then when the rack based system is first powered on, the user can select a workload option and the rack based server will boot up with the workload pre-installed and the storage access pre-defined. In another embodiment, virtual initiator table 250 is maintained and updated via access to management controller 230 through network interface 235. Here, an administrator can use a management station to access management controller 240 to add, delete, or modify virtual initiator entries 252, 254, and 256. For example, when a particular workload becomes unnecessary or obsolete, the administrator can delete the virtual initiator entry associated with the workload. Further, when a new workload is defined, the administrator can create a new virtual initiator entry that is associated with the new workload. Moreover, when the arrangement of storage volumes is changed such as when storage is migrated to a new storage array, the administrator can modify the effected virtual initiator entries associated with the new storage array.

In another embodiment, when server 200 is booted, uEFI 210 accesses lifecycle controller 240 to present a boot option for inputting a virtual initiator name that is not associated with one of virtual initiator entries 252, 254, and 256 in virtual initiator table 250. Here, upon determining that the inputted virtual initiator name is not associated with one of virtual initiator entries 252, 254, and 256 in virtual initiator table 250, management controller 230 issues a query via network interface 235 to other servers that are connected together on a management network similar to management network 140, to determine if the virtual initiator name is associated with any virtual initiator entries in the virtual initiator tables of the other servers. If the virtual initiator name is associated with a virtual initiator entry in another virtual initiator table, then management controller 230 imports the virtual initiator entry and adds it to virtual initiator table 250. Then uEFI 210 retrieves the boot information for the new workload and instantiates the boot information in initiator 215, and server 200 is booted with the storage access specified by the new virtual initiator entry.

If the virtual initiator name is not associated with a virtual initiator entry in another virtual initiator table, then uEFI 210 provides a message that the virtual initiator name is an unknown virtual initiator name. In a particular embodiment, uEFI 210 also aborts the attempt to boot server 200. In another embodiment, uEFI 210 presents an option to manually enter the boot information associated with the entered virtual initiator name, and management controller 230 adds an entry to virtual initiator table 250 that includes the boot information. In another embodiment, when a new virtual initiator entry is added to virtual initiator table 250, when one or more of virtual initiator entries 252, 254, or 256 is deleted from the virtual initiator table or is modified, management controller 230 pushes the changes in the virtual initiator table to the other servers on the management network, and the other servers reflect the changes in their respective virtual initiator tables.

Further, management controller 230 operates to issue a query to the other servers on the management network to determine if a workload associated with a virtual initiator name is active on one of the other servers, that is, whether or not a virtual initiator entry associated with the virtual initiator name is in use on one of the other servers. If not, then the workload is free to be instantiated on server 200, as described above. However if the workload is active, then uEFI 210 provides a message that the workload is active on another server. In a particular embodiment, uEFI 210 also aborts the attempt to boot server 200. In another embodiment, uEFI 210 presents an option to wait a predetermined amount of time to retry the boot up of server 200. The predetermined amount of time can be a long enough for an administrator to shut down the workload on the other server, before retrying the boot of server 200 with the selected virtual initiator name.

Figure 3:
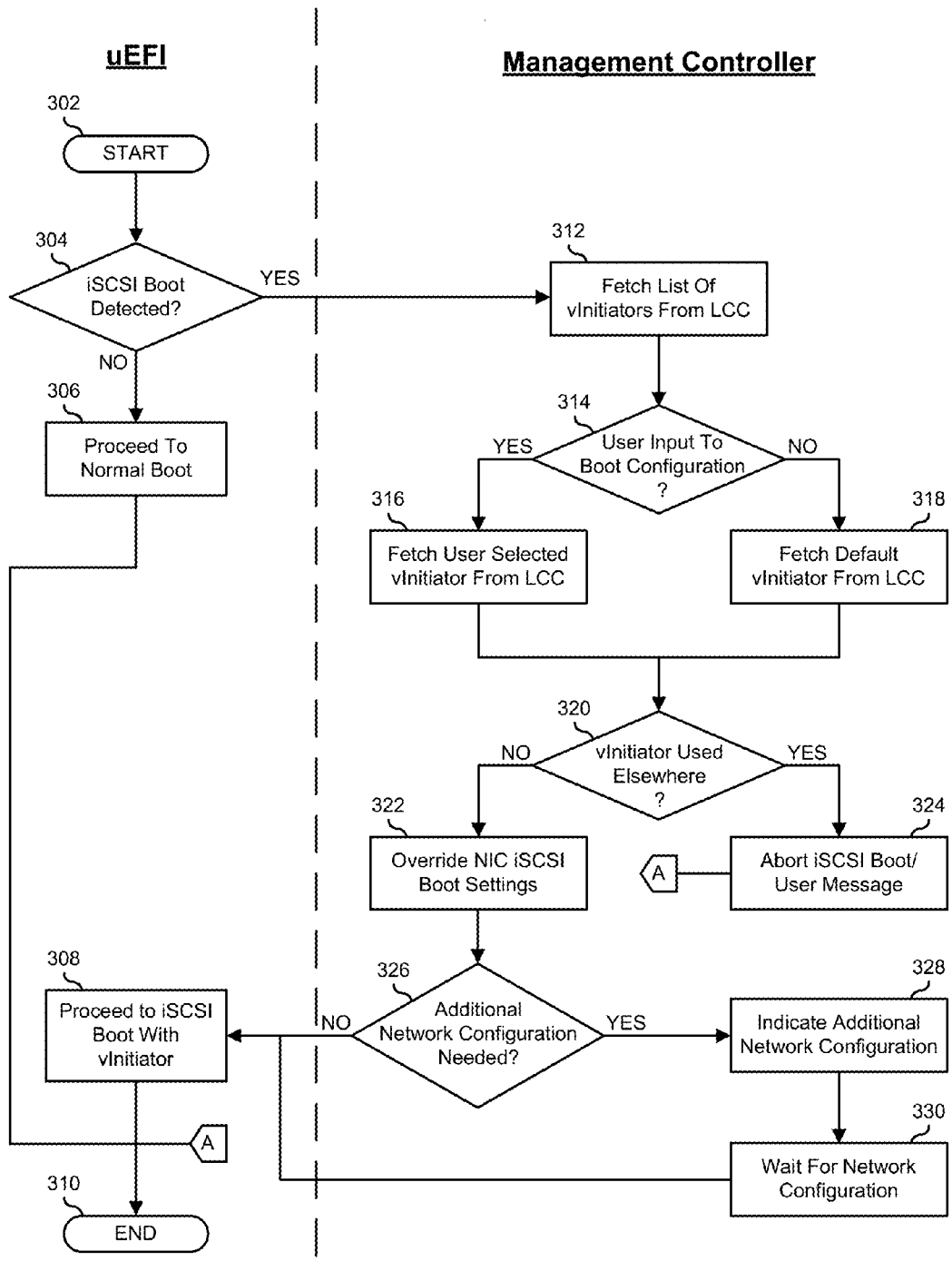
FIG. 3 is a flow diagram of a method of server re-provisioning via a management controller and virtual initiators according to an embodiment of the present disclosure.

FIG. 3 illustrates a method of server re-provisioning via a management controller and virtual initiators, starting with processing in a uEFI of a server in a server at block 302. A decision is made as to whether or not an iSCSI boot of a server system is detected in decision block 304. If not, the "NO" branch of decision block 304 is taken, the boot process for the server proceeds with a normal uEFI boot in block 306, and the method ends in block 310. For example, server 200 can implement a system boot up by uEFI 210, and the uEFI can detect boot settings that indicate that there is no iSCSI or iSCSI encapsulated storage network associated with the server, and the uEFI can proceed to boot up the server without further reference to iSCSI boot up procedures.

If an iSCSI boot of the server system is detected, the "YES" branch of decision block 304 is taken, and the method proceeds with processing in a management controller of the server, where the management controller fetches a list of virtual initiators from a lifecycle controller associated of the server in block 312. For example, uEFI 210 can detect boot settings that indicate that there is an iSCSI or iSCSI encapsulated storage network associated with the server, and the uEFI can issue an IPMI request to management controller 230 to proceed with an iSCSI enumeration of server 200. Management controller 230 can then fetch virtual initiator entries 252, 254, and 256 from virtual initiator table 250 of lifecycle controller 240. A decision is made as to whether or not a user input is received at a boot configuration option in decision block 314. For example, one or more of uEFI 210, management controller 230, and lifecycle controller 240 can present a user with an option to select one of virtual initiators 252, 254, and 256. The user selection option can be implemented such that if no selection is made within a predetermined amount of time, then the user is presumed to chosen to not make a selection, and the method can proceed in the absence of a selection.

If a user input is received at the boot configuration option in, the "YES" branch of decision block 314 is taken and the management controller fetches the selected virtual initiator entry including the boot information for the selected virtual initiator from the lifecycle controller in block 316. If a user input is not received at the boot configuration option, the "NO" branch of decision block 314 is taken and the management controller fetches a default virtual initiator entry including the boot information for the default virtual initiator from the lifecycle controller in block 318. After either the selected virtual initiator entry is fetched in block 316, or the default virtual initiator entry is fetched in block 318, a decision is made by the management controller as to whether or not the fetched virtual initiator entry is being used elsewhere in a storage network that includes the server in decision block 320. For example, management controller 230 can issue a query via network interface 235 on the management network to determine if the virtual initiator is being used by any of the other servers on the storage network that includes server 200.

If the fetched virtual initiator entry is being used elsewhere in a storage network that includes the server, the "YES" branch of decision block 320 is taken, the iSCSI boot process is aborted and a user message is presented that the fetched virtual initiator entry is in use elsewhere on the storage network in block 324, and the method ends in block 310. For example, management controller 230 can receive information on the management network that one of the other servers is implementing the fetched virtual initiator, and can direct uEFI 210 to abort the iSCSI boot up and to present a message that the fetched virtual initiator entry is in use elsewhere on the storage network. In another embodiment, the management controller provides the message that the fetched virtual initiator entry is in use elsewhere on the storage network, but then waits a predetermined amount of time to allow an administrator to shut down the server that is using the fetched virtual initiator, and then the method can proceed by taking the "NO" branch of decision block 320, as described below.

If the fetched virtual initiator entry is not being used elsewhere in the storage network that includes the server, the "NO" branch of decision block 320 is taken, and the boot settings of a network interface of the server are overridden in block 322. For example, one or more of uEFI 210 and management controller 230 can implement the boot information included in the fetched virtual initiator, either by bypassing the boot settings of network interface 220, or by overwriting the boot settings of the network interface with the boot settings included in the fetched virtual initiator. A decision is made as to whether or not additional network configuration is needed in order to successfully re-provision or re-purpose the server in decision block 326. If not, the "NO" branch of decision block 326 is taken, and the method proceeds with processing in the uEFI of the server, where the uEFI proceeds with the iSCSI boot procedure with the boot information included in the fetched virtual initiator in block 308, and the method ends in block 310. If additional network configuration is needed in order to successfully re-provision or re-purpose the server, the "YES" branch of decision block 326 is taken, and the management controller issues an alert/indication on the management network that additional network configuration is needed in block 328. For example, an additional-network-configuration-required field can indicate that the workload associated with the fetched virtual initiator includes one or more VPNs, the presence of which necessitates additional configuration in the switching paths to the server, before server 200 can be successfully booted. The management controller waits for an indication that the network has been configured as indicated by the additional-network-configuration-required field in block 220, and the method proceeds to block 308 where the uEFI proceeds with the iSCSI boot procedure with the boot information included in the fetched virtual initiator, and the method ends in block 310.

Figure 4:
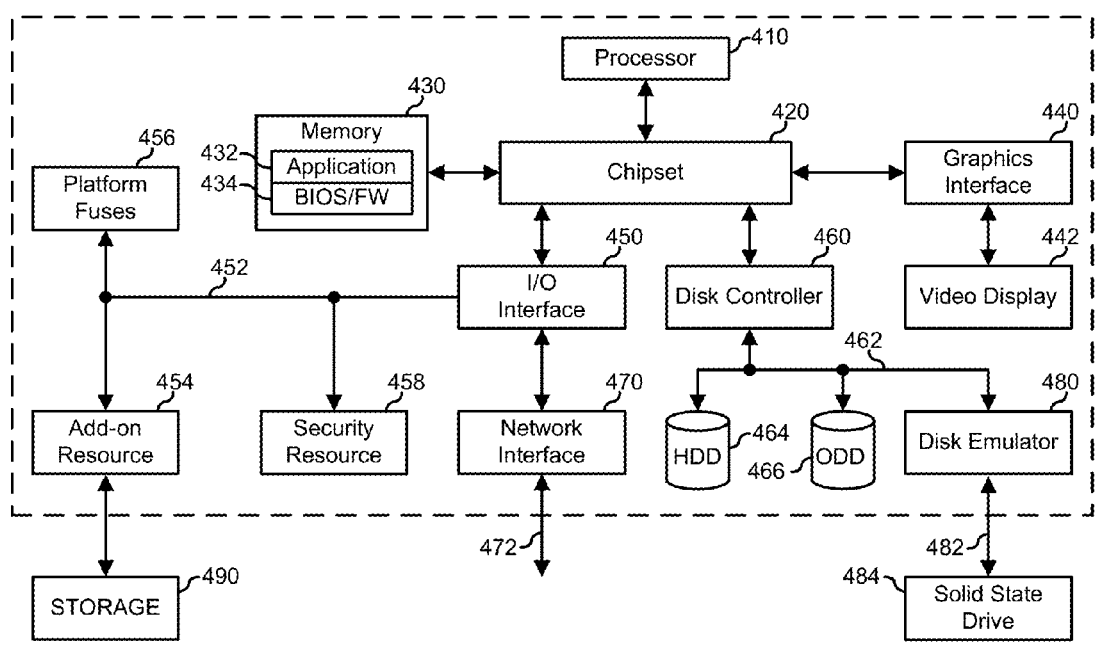
FIG. 4 is a functional block diagram illustrating an exemplary embodiment of an information handling system.

FIG. 4 illustrates an information handling system 400, including a processor 410, a chipset 420, a memory 430, a graphics interface 440, an input/output (I/O) interface 450, a disk controller 460, a network interface 470, and a disk emulator 480. In a particular embodiment, information handling system 400 is used to carry out one or more of the methods described herein. In another embodiment, one or more of the systems described herein are implemented in the form of information handling system 400.

Chipset 420 is connected to and supports processor 410, allowing the processor to execute machine-executable code. In a particular embodiment, information handling system 400 includes one or more additional processors, and chipset 420 supports the multiple processors, allowing for simultaneous processing by each of the processors and permitting the exchange of information among the processors and the other elements of the information handling system. Chipset 420 can be connected to processor 410 via a unique channel, or via a bus that shares information among the processor, the chipset, and other elements of information handling system 400.

Memory 430 is connected to chipset 420. Memory 430 and chipset 420 can be connected via a unique channel, or via a bus that shares information among the chipset, the memory, and other elements of information handling system 400. In another embodiment (not illustrated), processor 410 is connected to memory 430 via a unique channel. In another embodiment (not illustrated), information handling system 400 includes separate memory dedicated to each of the one or more additional processors. A non-limiting example of memory 430 includes static random access memory (SRAM), dynamic random access memory (DRAM), non-volatile random access memory (NVRAM), read only memory (ROM), flash memory, another type of memory, or any combination thereof.

Graphics interface 440 is connected to chipset 420. Graphics interface 440 and chipset 420 can be connected via a unique channel, or via a bus that shares information among the chipset, the graphics interface, and other elements of information handling system 400. Graphics interface 440 is connected to a video display 442. Other graphics interfaces (not illustrated) can also be used in addition to graphics interface 440 as needed or desired. Video display 442 includes one or more types of video displays such as a flat panel display, another type of display device, or any combination thereof.

I/O interface 450 is connected to chipset 420. I/O interface 450 and chipset 420 can be connected via a unique channel, or via a bus that shares information among the chipset, the I/O interface, and other elements of information handling system 400. Other I/O interfaces (not illustrated) can also be used in addition to I/O interface 450 as needed or desired. I/O interface 450 is connected via an I/O interface 452 to one or more add-on resources 454. Add-on resource 454 is connected to a storage system 490, and can also include another data storage system, a graphics interface, a network interface card (NIC), a sound/video processing card, another suitable add-on resource or any combination thereof. I/O interface 450 is also connected via I/O interface 452 to one or more platform fuses 456 and to a security resource 458. Platform fuses 456 function to set or modify the functionality of information handling system 400 in hardware. Security resource 458 provides a secure cryptographic functionality and includes secure storage of cryptographic keys. A non-limiting example of security resource 458 includes a Unified Security Hub (USH), a Trusted Platform Module (TPM), a General Purpose Encryption (GPE) engine, another security resource, or a combination thereof.

Disk controller 460 is connected to chipset 420. Disk controller 460 and chipset 420 can be connected via a unique channel, or via a bus that shares information among the chipset, the disk controller, and other elements of information handling system 400. Other disk controllers (not illustrated) can also be used in addition to disk controller 460 as needed or desired. Disk controller 460 includes a disk interface 462. Disk controller 460 is connected to one or more disk drives via disk interface 462. Such disk drives include a hard disk drive (HDD) 464, and an optical disk drive (ODD) 466, and can include one or more disk drive as needed or desired. ODD 466 can include a Read/Write Compact Disk (R/W-CD), a Read/Write Digital Video Disk (R/W-DVD), a Read/Write mini Digital Video Disk (R/W mini-DVD, another type of optical disk drive, or any combination thereof. Additionally, disk controller 460 is connected to disk emulator 480. Disk emulator 480 permits a solid-state drive 484 to be coupled to information handling system 400 via an external interface 482. External interface 482 can include industry standard busses such as USB or IEEE 1394 (Firewire) or proprietary busses, or any combination thereof. Alternatively, solid-state drive 484 can be disposed within information handling system 400.

Network interface device 470 is connected to I/O interface 450. Network interface 470 and I/O interface 450 can be coupled via a unique channel, or via a bus that shares information among the I/O interface, the network interface, and other elements of information handling system 400. Other network interfaces (not illustrated) can also be used in addition to network interface 470 as needed or desired. Network interface 470 can be a network interface card (NIC) disposed within information handling system 400, on a main circuit board such as a baseboard, a motherboard, or any combination thereof, integrated onto another component such as chipset 420, in another suitable location, or any combination thereof. Network interface 470 includes a network channel 472 that provide interfaces between information handling system 400 and other devices (not illustrated) that are external to information handling system 400. Network interface 470 can also include additional network channels (not illustrated).

Information handling system 400 includes one or more application programs 432, and Basic Input/Output System and Firmware (BIOS/FW) code 434. BIOS/FW code 434 functions to initialize information handling system 400 on power up, to launch an operating system, and to manage input and output interactions between the operating system and the other elements of information handling system 400. In a particular embodiment, application programs 432 and BIOS/FW code 434 reside in memory 430, and include machine-executable code that is executed by processor 410 to perform various functions of information handling system 400. In another embodiment (not illustrated), application programs and BIOS/FW code reside in another storage medium of information handling system 400. For example, application programs and BIOS/FW code can reside in HDD 464, in a ROM (not illustrated) associated with information handling system 400, in an option-ROM (not illustrated) associated with various devices of information handling system 400, in storage system 490, in a storage system (not illustrated) associated with network channel 472, in another storage medium of information handling system 400, or a combination thereof. Application programs 432 and BIOS/FW code 434 can each be implemented as single programs, or as separate programs carrying out the various features as described herein.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), nonvolatile (read-only memory, flash memory etc.) or any combination thereof), one or more processing resources such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
    determining, by a management controller of a first server in a storage network, if a first virtual initiator is used by a second server in the storage network, wherein the first virtual initiator includes first boot information for allocating a first storage resource of the storage network, and wherein the first virtual initiator is received from a lifecycle controller of the first server;
    aborting a boot up of a processor of the first server in response to determining that the first virtual initiator is being used by the second server, wherein the processor and the management controller are separate processing units of the first server; and
    proceeding with the boot up of the processor in response to determining that the first virtual initiator is not used by the second server, wherein the boot up proceeds using the first boot information to allocate the first storage resource to the first server.

2. The method of claim 1, further comprising:
    detecting, by a Unified Extensible Firmware Interface (uEFI) of the first server, that the first server is in the storage network;
    fetching, by the management controller, a list of virtual initiators from the lifecycle controller, the list of virtual initiators including the first virtual initiator, wherein the fetching is in response to detecting that the first server is in the storage network; and
    selecting, by the uEFI, the first virtual initiator;
    wherein determining if the first virtual initiator is used by the second server is in response to selecting the first virtual initiator.

3. The method of claim 2, wherein first virtual initiator is selected in response to a user input.

4. The method of claim 2, wherein the first virtual initiator is selected as a default virtual initiator.

5. The method of claim 1, wherein determining if the first virtual initiator is used by the second server further comprises:
    querying, by the management controller, a management network that includes the first server and the second server; and
    receiving an indication if the first virtual initiator is used by the second server.

6. The method of claim 1, wherein proceeding with the boot up of the processor further comprises:
    overriding second boot information for allocating a second storage resource of the storage network, wherein the second boot information is provided by a network interface of the first server.

7. The method of claim 6, wherein overriding the second boot information further comprises:
    overwriting the second boot information in the network interface with the first boot information.

8. The method of claim 1, further comprising:
determining that the first boot information indicates that a network component of the storage network needs to be reconfigured prior to proceeding with the boot up of the processor; and
sending, by the management controller, an indication to the network component that the network component needs to be reconfigured.

9. The method of claim 8, further comprising:
receiving, by the management controller, an indication that the network component has been reconfigured;
wherein proceeding with the boot up of the processor is in further response to receiving the indication that the network component has been reconfigured.

10. A first server comprising:
a first processor;
a lifecycle controller;
a second processor, wherein the first processor and the second processor are separate processing units of the first server, the first processor operable to:
boot up the first processor in response to determining that a first virtual initiator is not used by a second server, wherein the first virtual initiator includes first boot information for allocating a first storage resource of a storage network, wherein the boot up proceeds using first boot information to allocate the first storage resource to the first server, wherein the first virtual initiator is received from the lifecycle controller, and wherein the storage network includes the first server and the second server; and
abort the boot up of the first processor in response to determining that the first virtual initiator is being used by the second server; and
a management controller operable to determine if the first virtual initiator is used by the second server.

11. The server of claim 10, wherein:
the first processor is further operable to:
detect that the first server is in the storage network; and
select the first initiator from a list of virtual initiators including the first virtual initiator; and
the management controller is further operable to;
fetch, from the lifecycle controller, the list of virtual initiators in response to detecting that the server is in the storage network.

12. The server of claim 10, wherein in determining if the first virtual initiator is used by the second server, the management controller is further operable to:
query a management network that includes the first server and the second server; and
receive an indication if the first virtual initiator is used by the second server.

13. The server of claim 10, wherein in proceeding with the boot up of the first server, the first processor is further operable to:
override second boot information for allocating a second storage resource of the storage network, wherein the second boot information is provided by a network interface of the first server.

14. The server of claim 13, wherein overriding the second boot information, the first processor is further operable to:
overwrite the second boot information in the network interface with the first boot information.

15. The server of claim 10, wherein the management controller is further operable to:
determine that the first boot information indicates that a network component needs to be reconfigured prior to proceeding with the boot up of the first server; and
send an indication to the network component that the network component needs to be reconfigured.

16. The server of claim 15, wherein the management controller is further operable to:
receive an indication that the network component has been reconfigured;
wherein proceeding with the boot up of the processor is in further response to receiving the indication that the network component has been reconfigured.

17. A non-transitory computer-readable medium including code for performing a method, the method comprising:
determining at a management controller of a first server in a storage network, if a first virtual initiator is used by a second server in the storage network, wherein the first virtual initiator includes first boot information for allocating a first storage resource of the storage network, and wherein the first virtual initiator is received from a lifecycle controller of the first server;
aborting a boot up of a processor of the first server in response to determining that the first virtual initiator is being used by the second server, wherein the processor and the management controller are separate processing units of the first server; and
proceeding with the boot up of the processor in response to determining that the first virtual initiator is not used by the second server, wherein the boot up proceeds using the first boot information to allocate the first storage resource to the first server.

18. The computer-readable medium of claim 17, wherein in determining if the first virtual initiator is used by the second server, the method further comprises:
querying, by the management controller, a management network that includes the first server and the second server; and
receiving from the second server an indication if the first virtual initiator is used by the second server.

19. The computer-readable medium of claim 17, wherein in proceeding with the boot up of the first server, the method further comprises:
overriding second boot information for allocating a second storage resource of the storage network, wherein the second boot information is provided by a network interface of the first server.

20. The computer-readable medium of claim 17, the method further comprises:
determining that the first boot information indicates that a network component needs to be reconfigured prior to proceeding with the boot up of the server; and
sending, by the management controller, an indication to the network component that the network component needs to be reconfigured.

* * * * *